United States Patent
Fox et al.

(10) Patent No.: US 7,388,606 B2
(45) Date of Patent: Jun. 17, 2008

(54) METHOD AND APPARATUS FOR CREATING A DIGITAL PICTURE WITH A WATERMARK AS WELL AS REMOVING THE WATERMARK FROM THE DIGITAL PICTURE

(76) Inventors: Harry Fox, 4 Hasadna Street, Talpiot 91530 Jerusalem (IL); Jacob Benjamin, 4 Hasadna Street, Talpiot 91530 Jerusalem (IL); Ronnie Wulfson, 4 Hasadna Street, Talpiot 91530 Jerusalem (IL)

( * ) Notice: Subject to any disclaimer, the term of this patent is extended or adjusted under 35 U.S.C. 154(b) by 144 days.

(21) Appl. No.: 11/028,212

(22) Filed: Jan. 4, 2005

(65) Prior Publication Data

US 2005/0140788 A1    Jun. 30, 2005

Related U.S. Application Data

(63) Continuation-in-part of application No. 10/261,409, filed on Oct. 2, 2002, now Pat. No. 6,888,569.

(51) Int. Cl.
*H04N 5/262* (2006.01)
*H04N 5/76* (2006.01)

(52) U.S. Cl. .................... 348/239; 348/231.3

(58) Field of Classification Search .............. 358/3.28; 382/100; 713/176; 348/239, 231.3, 231.6
See application file for complete search history.

(56) References Cited

U.S. PATENT DOCUMENTS

| | | | |
|---|---|---|---|
| 5,170,253 A | 12/1992 | Horiuchi et al. | |
| 5,528,293 A | 6/1996 | Watanabe | |
| 5,805,215 A | 9/1998 | Mizoguchi | |
| 5,862,218 A * | 1/1999 | Steinberg | 348/231.3 |
| 5,973,734 A | 10/1999 | Anderson | |
| 6,014,170 A | 1/2000 | Pont et al. | |
| 6,154,576 A | 11/2000 | Anderson et al. | |
| 6,445,460 B1 | 9/2002 | Pavley | |
| 6,483,540 B1 | 11/2002 | Akasawa et al. | |
| 6,556,243 B1 | 4/2003 | Dotsubo et al. | |
| 6,628,417 B1 * | 9/2003 | Naito et al. | 358/1.15 |
| 6,683,649 B1 | 1/2004 | Anderson | |
| 6,704,047 B1 | 3/2004 | Tsutsui | |
| 2002/0093567 A1 * | 7/2002 | Cromer et al. | 348/222 |
| 2003/0035585 A1 * | 2/2003 | Osborne et al. | 382/305 |
| 2003/0105950 A1 * | 6/2003 | Hirano et al. | 713/100 |
| 2003/0131237 A1 * | 7/2003 | Ameline et al. | 713/176 |
| 2003/0179900 A1 * | 9/2003 | Tian et al. | 382/100 |

* cited by examiner

*Primary Examiner*—Lin Ye
*Assistant Examiner*—Jason Whipkey
(74) *Attorney, Agent, or Firm*—Bernard Malina; Malina & Associates, PLLC

(57) ABSTRACT

A method and system for incorporating a watermark into an original digital picture utilizes an image file, such as a JPEG file to store a watermark or otherwise altered rendition of an original digital picture. The marker section of the JPEG file would include the original digital picture as well as meta data relating to the watermark as well as a copyright notice. Additionally, a password is encrypted and embedded into the header section of the JPEG file. Therefore, an end user could only download and print the original digital picture by the proper entering of a password supplied by originator of the JPEG file.

21 Claims, 10 Drawing Sheets

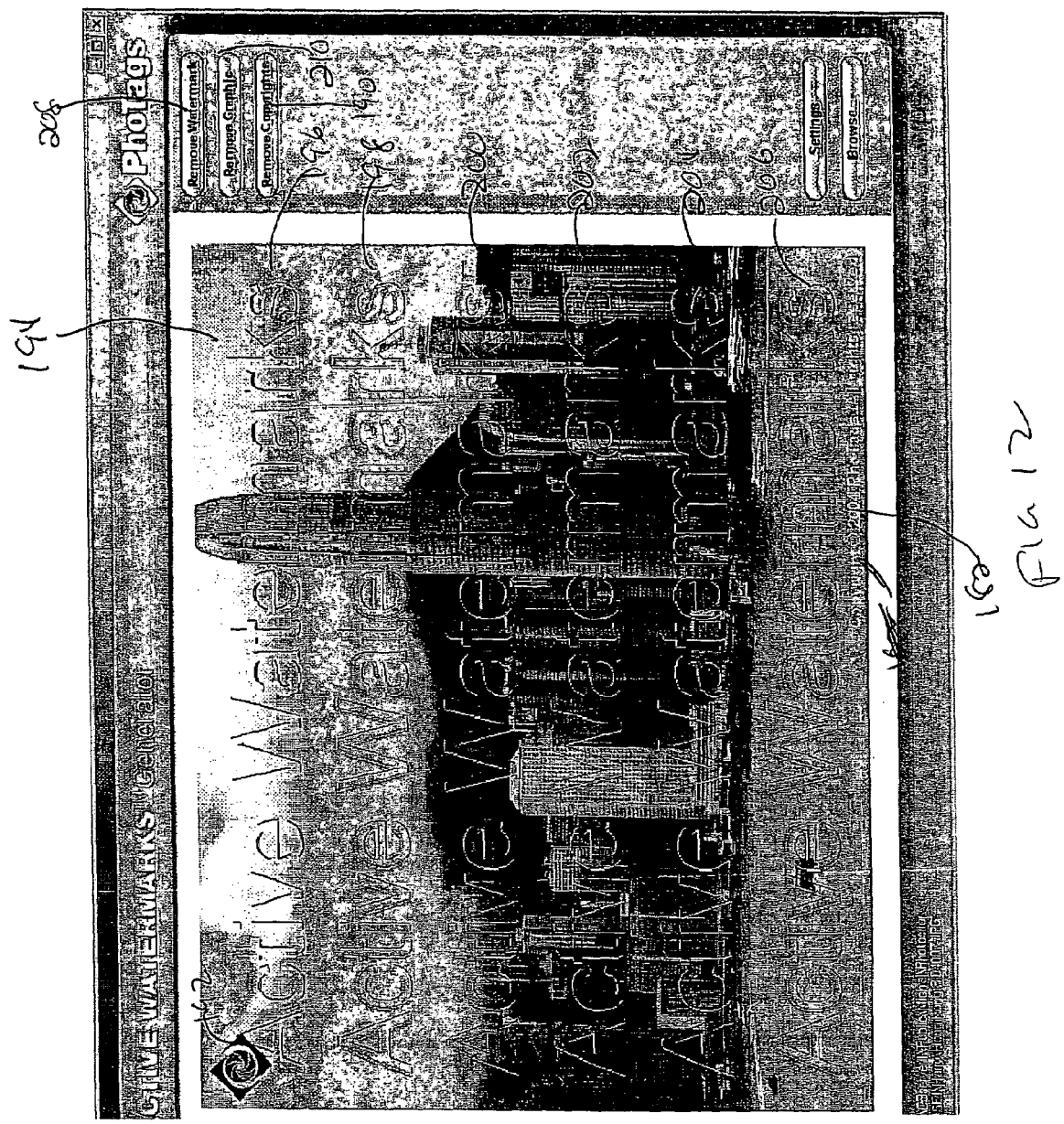

METHOD AND APPARATUS FOR CREATING A DIGITAL PICTURE WITH A WATERMARK AS WELL AS REMOVING THE WATERMARK FROM THE DIGITAL PICTURE

CROSS-REFERENCED APPLICATION

The present application is a continuation-in-part application of Ser. No. 10/261,409 filed on Oct. 2, 2002 now U.S. Pat. No. 6,888,569, entitled Method and Apparatus for Creating A Digital Picture with Textual Material.

FIELD OF THE INVENTION

The present invention relates to a method and apparatus for appending textual material to digital photographs included in image files, such as those using the JPEG format and transferring these files to a remote source, the textual material including a watermark used to prevent the unauthorized use of the digital photographs.

BACKGROUND OF THE INVENTION

The current technology on the market permits cameras to take digital or non-digital pictures, and attach date and time stamps to the picture. The date and time stamps become permanent non-modifiable information that is either attached to the developed picture of pasted as pixels into a digital picture. This implies that if a particular viewer of the picture does not want to view the additional data attached to the picture, they will not have the opportunity to do so. Furthermore, if someone wants to modify or remove that data, that is also not possible.

Other current technologies exist that permit users to add captions to their digital pictures. However, these captions are stored in a database on a local machine or Internet site. If the user wants to move a picture from one environment to another, or send digital pictures to other users, then the caption does not move with the picture. Furthermore, if a sound file was attached to the JPEG file, the same problems would exist with respect to transmitting both the photograph and the sound.

Several U.S. patents have issued generally relating to the subject matter of transferring JPEG files. For example, U.S. Pat. No. 6,014,170, issued to Pont et al is directed to an information processing apparatus which stores information in recording units. Each recording unit includes at least one of a main image data, a sub-image data, and audio data. As illustrated in FIG. 5, the main image data, sub-image data as well as the audio data are stored in a random access memory in a mixed form. The main image data includes header information and image data. The header information includes index information, information indicating the type of data, information indicating the date when the image was taken, information indicating the start address of an area in which the data was stored, and information indicating the data length of the image data. The data structure for the sub-image data would be similar to the image structure of the main image data. However, this patent does not describe a situation in which when data is transferred from one location to a second location, such information such as textual data or other types of captioned material could be altered by an authorized user.

U.S. Pat. No. 5,805,215, issued to Mizoguchi shows an information processing method and apparatus utilizing a notebook-type electronic camera. Various information relating to a particular image, such as the date of the image is automatically recorded along with the image data.

U.S. Pat. No. 5,170,253, issued to Horiuchi et al illustrates an apparatus for superimposing a title onto an image produced by a video camera. A title to be displayed is elected by a control signal from a control signal input terminal. Both the patents to Mizoguchi and Horiuchi et al, while discussing adding material to a digital photograph, neither of these patents suggest a manner for insuring that only authorized individuals could alter the non-photographic material after it is sent from a first location to a second location.

While the utilization of JPEG files to create digital pictures constitutes a remarkable breakthrough in the field of creating realistic images, as well as easily having the ability of transmitting the digital pictures to various remote locations, it also poses the problem of protecting the rights of individuals who created and copyrighted these images. Several techniques have been utilized, primarily employing the use of a watermark to endeavor to protect the unauthorized usage of these protected digital pictures.

For example, traditional watermarks can be provided for this purpose. A graphical watermark (i.e., not for resale) is permanently added to a copy of the digital image that is available for downloading from the Internet. This watermark is semi-transparent or translucent, allowing the end user to see what the image looks like, but would prevent the use of the image due to the presence of the watermark. Once the end user has paid for the use of the digital image through a digital rights management (DRM) arrangement, such as purchasing the rights in the image, or obtaining a license for the use of the digital image, the end user is then sent a link to download the original image without the watermark. However, this solution creates the problem that the seller must maintain two copies of the images on line and once the second image is downloaded, the protection against unauthorized replication of the digital image is not present. This is particularly important since the end user might have only purchased a limited use of the digital image in certain environments. Additionally, even if the end user has the complete right to utilize the digital image, since the digital image is transmitted over the Internet, an unauthorized user or users would have the ability of utilizing the non-watermarked image for their own unauthorized use. It is important to note that in this situation, there is no way to prevent the unauthorized usage of the transmitted unwatermarked digital image.

A second method of protecting against the unauthorized usage of a digital image would be by employing invisible watermarks. Generally, an invisible watermark consists of imbedding information between the pixels of the digital image in a manner so this additional information cannot be removed. Virtually, all the new drivers licenses in the United States utilize this technology. The drawback of this method is that, although the unauthorized usage of the digital image can be monitored by an individual electronically examining the invisible watermarked image, it does not prevent the unauthorized usage of that image since there is no visible deterrent.

It will be appreciated from the foregoing that there is still need for improvement in a system and method of attaching non-photographic material to a photograph, transmitting both the photographic and non-photographic material and allowing only authorized individuals to modify the non-photographic material at a second location remote from a first location.

It will also be appreciated from the foregoing that there is a need to provide a method and system for watermarking a digital picture or image to prevent th unauthorized usage of the digital picture, while at the same time transmitting the watermarked digital picture to an authorized user, who would have the ability to remove or have removed the watermark from the digital picture in such a manner to allow for its authorized use, but, at the same time, would prevent the unauthorized use of the digital picture.

SUMMARY OF THE INVENTION

The deficiencies of the prior art are addressed in the present invention which would allow individuals to take digital pictures and attach textual data to the picture file itself so that the data will accompany the picture wherever it goes. If it is sent through the Internet or any other medium, the accompanying text, or, additionally, an audio file, is always attached to the digital picture both in the picture itself and as an ASCII text so that it is capable of being edited. Information provided in a JPEG marker would include a password allowing only a certain individual or individuals to edit the digital, non-picture material. Furthermore, the present invention would allow individuals to modify certain information in the digital picture, but not allow modification of other information in the picture. Additionally, the present invention would allow certain individuals to modify one type of information and other individuals to modify a different type of information. While the present invention will be explained with respect to the JPEG file format, it is important to note that it would have application to any image file format having the capability of storing meta data within the image file.

The text/audio material that is attached to the picture will be viewable for anyone that receives the picture. The user would determine exactly where and how this text will be displayed with the photograph. The textual material can be produced as a caption displayed around any of the borders of the picture or could be directly included in the picture itself by overlaying certain pixels of the picture. However, only those having the appropriate photograph tags application will be permitted to modify the text if they so desire, providing that the owner of the picture has sent permission to allow this. Furthermore, based upon the password or passwords included in the application, certain individuals would have the ability to modify all of the textual/audio material, while other individuals could only edit a portion of this material.

Other individuals that receive the photograph would not require any special technology to view the captions or other types of data that is attached to the photograph, since the creator of the additional data and/or sound will attach this additional information as part of the digital photograph. The non-photographic material will be provided in the digital photographic file in its raw form, so that if the creator requires modification of a text, this will be possible.

Furthermore, since the actual textual/audio data will be stored inside the JPEG file, it will now be possible to search all of one's photographs on their personal computer or other device for textual data. For example, if textual material, such as the location of a photograph is added to the digital photograph, the owner of these photographs could search for only those photographs which were taken at a certain location or of a particular individual. Furthermore, if a number of photographers sent captioned material to a news organization, such as a newspaper, this organization could search for all of the photographs submitted by a certain photographer, or on a certain subject, or by the date of the picture. The combination that could be searched would vary with the type of material stored in the JPEG file.

It would now become possible based upon the present invention to make each picture into a separate database suppository of data that describes attributes about that picture, and when joined together with many other photograph tagged pictures, it becomes possible to build a database of pictures, where each picture has information describing the contents of the picture. Thus, when joined with many other pictures, this will form a database of pictures that can be searched and processed as a group or as individual pictures.

The application software utilized to produce the desired results of attaching textual captions and audio material directly to a digital photograph, viewing this photograph as well as editing this photograph would reside in many different devices, such as personal computers, hand-held computers or even cameras that will know how to edit and display this digital data in any form. The photography tagged technology would be published as a software developing kit preventing (SDK) so that third parties may integrate the concept of adding and editing textual and audio captions into digital photographs in their own products. The present invention extends the current market file format restoring digital pictures in the JPEG format by utilizing certain reserve tags in the JPEG file for adding the data required to store the metadata into the JPEG file for editing.

The problem of properly policing the digital rights of a proprietary digital picture, such as covered by copyright, is also addressed by the present invention. Although the teachings of the present application describe a system and method of adding textual material to a digital picture, this textual material, while not limited to, is generally directed to a situation in which only a small portion of the digital picture is removed and replaced by textual material. It therefore, does not address the situation in which a watermark would be applied to a large portion of the digital picture, so as to prevent unauthorized use of that digital picture.

The watermark is applied to the digital picture as a virtual overlay of the picture, in such a manner to allow an authorized user to view the digital picture with the watermark applied thereto, but would not allow the user to appropriately utilize the digital picture without having the watermark removed therefrom. The watermark is applied to the digital picture as well as being stored in the JPEG file in such a manner that the transmission of the digital picture with the watermark to an authorized end user, would allow the end user to have the watermark be removed, either by the end user, or by the party which initiated the transmission of the watermarked digital picture. In one embodiment of the invention, if the end user is given only a limited right to use the digital picture without the watermark included thereon, once the limited use is completed, the watermark would reappear.

BRIEF DESCRIPTION OF THE DRAWINGS

The present invention will be understood and appreciated more fully from the following detailed description taken in conjunction with the appended drawings in which:

FIG. 12 is the drawing of FIG. 11 with a watermark applied to the original digital picture.

DETAILED DESCRIPTION OF THE INVENTION

Figure 1:
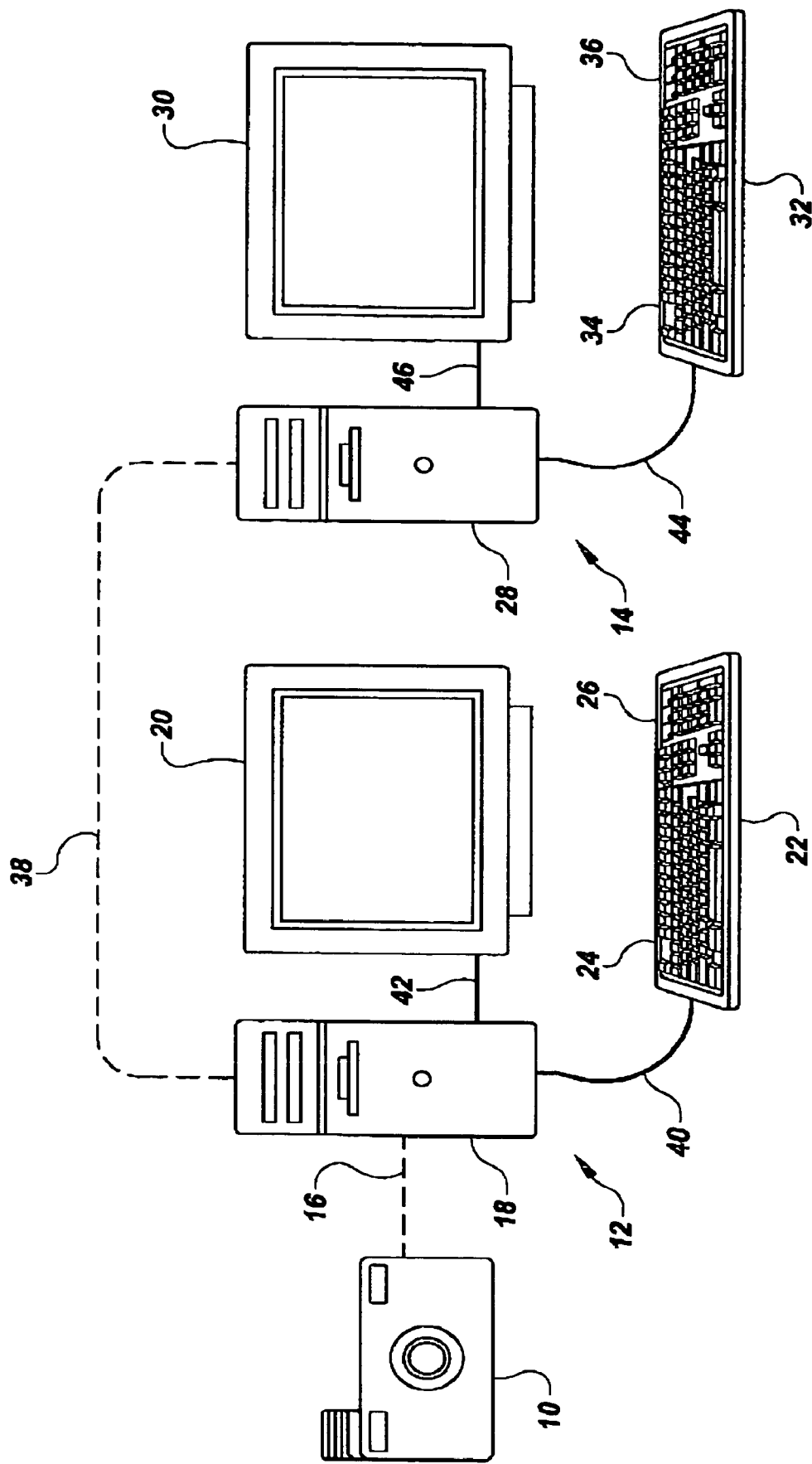
FIG. 1 is a block diagram of the environment of use in the present invention.

FIG. 1 illustrates the environment in which the present invention would operate. A picture is taken utilizing any type of standard digital camera 10. This digital picture is transferred to a first computer or similar input device 12 and is ultimately transferred to a second computer or a similar memory device 14. The digital picture is transferred to the hard drive 18 of the first digital computer 12 by any conventional means such as physically loading a disk into the hard drive 18 or by wired or wireless communication between the camera 10 and the hard drive 18. The computer is provided with a monitor 20 and keyboard 22. The keyboard 22 is provided with standard alphanumeric keys 24 as well as standard function keys 26. The keyboard 22 is connected to a standard memory contained in the hard drive 18 by a connection 40. The hard drive 18 is connected to the monitor 20 by connection 42.

Similar to the first computer 12, the second computer 14 includes a hard drive 28 provided with a memory therein, a monitor 30, as well as a standard keyboard 32 including standard alphanumeric keys 34 and standard function keys 36. The keyboard 32 is connected to the hard drive 28 via a communication line 44 and the display 30 is connected to the hard drive 28 via a communication line 46. Information is transmitted between the hard drive 18 of the first computer 12 and the hard drive 28 of the first computer 14 via any known communications link 38 such as a wired link, a wireless link as well as the Internet.

Figure 2:
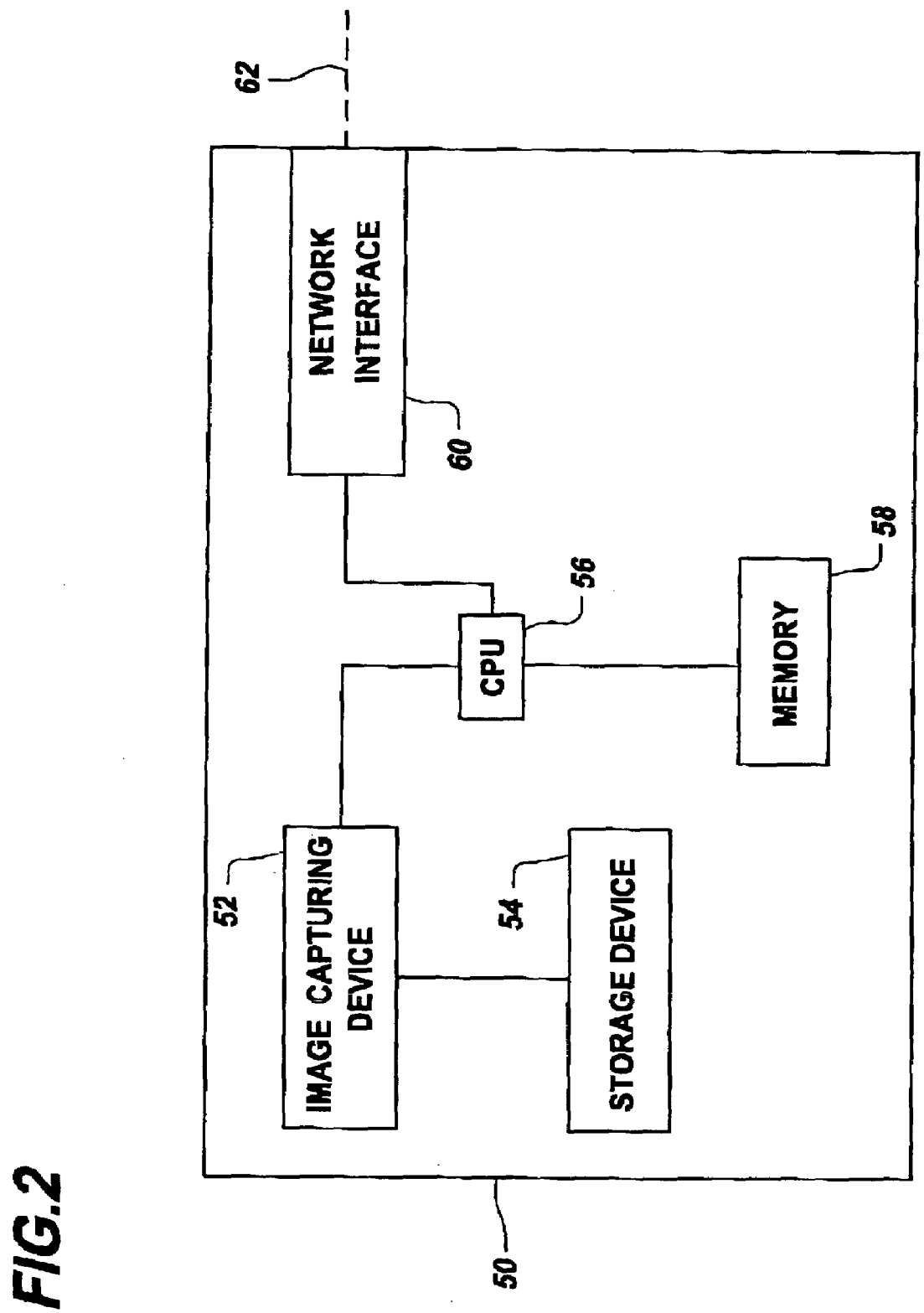
FIG. 2 is a block diagram showing the major components of a camera used to take digital photographs.

FIG. 2 broadly illustrates the operation features 50 of a standard digital camera 10. These features include an image capturing device 52 for capturing an image as well as a storage device 54 for capturing one or more images in a digital format. A CPU 56 controls the operation of the digital camera in concert with a memory 58. The information contained in the storage device 54 is then introduced to a network interface 60 for the purpose of transmitting the digital image or images to a communications network 62 such as the Internet or any other type of wired or wireless communication.

One of the purposes of the present invention is to allow a caption to be added to a photograph in such a manner that both the caption and the photograph are stored as one JPEG file such that the entire file can be transferred from one memory device such as a computer to a second memory device such as a computer. Additionally, the present invention would allow the textual information to be altered by an individual having permission from the person generating the photograph and appended captioned material. It is also noted that a caption need not be limited to textual material and could also include sound such as a verbal commentary for music or any other type of supporting sound to enrich the photograph. This sound file will be any standard sound file format such as WAV. Other types of textual material would include a caption describing the contents of the photograph, the photographer's name, a copyright notice as well as a time stamp. The photographer's name as well as the copyright notice would include as ASCII string with the name of the photographer as well as the copyright notice. It is also noted that the term "textual material" utilized with this invention would include one or more of the above-noted metadata attributes as well as any additional attributes which would fulfill the scope of the present invention. Furthermore, it is noted that the computer or memory device could also be a camera or cellular phone.

The above-noted textual attributes can be appended to the bottom of the photograph or embedded in any form directly in the photograph. Information relating to the position of the textual material would be included in the JPEG file. Furthermore, the present invention would allow the textual material to be displayed in various fonts, colors and sizes as well as a display angle in the digital photograph. Additionally, the X,Y position in the picture of any of the above-noted textual attributes as well as the rotation angle, background color (if the textual material is not embedded in the picture) as well as the text color, font name, font size and font style (any combination of bold, underline, italics or the like) would also be stored in the JPEG file format.

A standard JPEG format utilizes markers to break the JPEG file stream into its component structures. Each marker is two bytes in length with the first byte always having the value FF and the second byte containing a code that specifies the marker type. The JPEG standard is fairly flexible when it comes to ordering the markers within a file. The only rule that is employed is that each file must begin with a start of image (SOI) marker and end with an end of image (EOI) marker. In most cases, all other markers can appear in any order.

Figure 3:
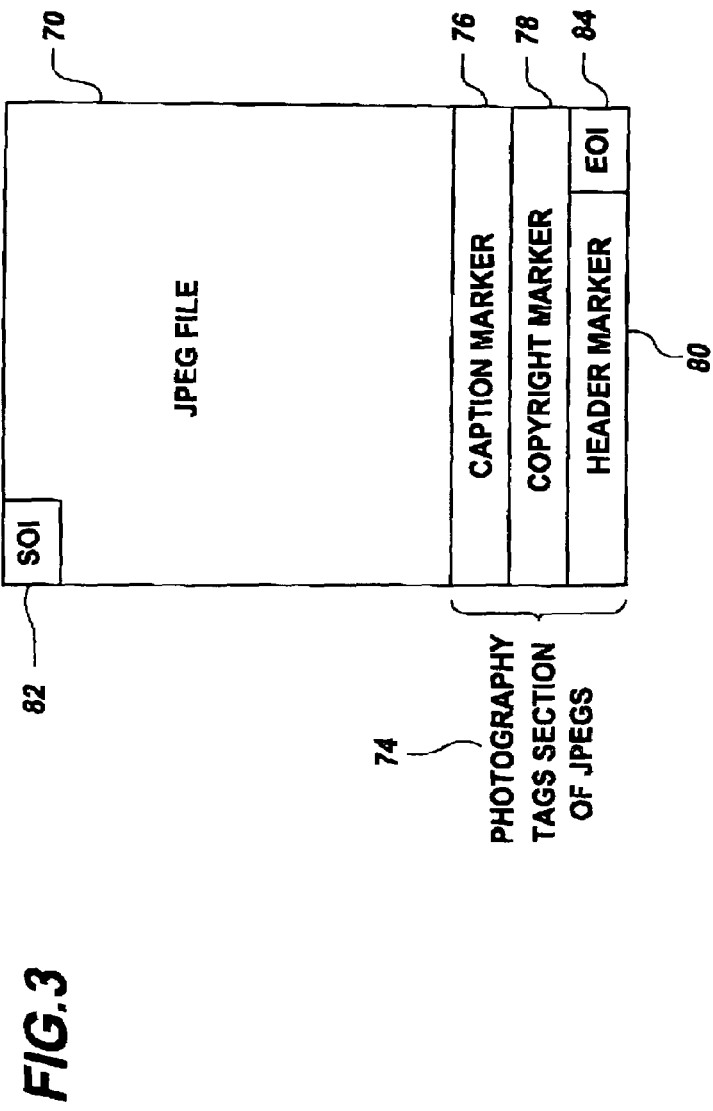
FIG. 3 is a diagram of a JPEG file showing textual material contained therein.

FIG. 3 would illustrate a typical JPEG file that would appear, for example, on the display 30 of the first computer 12 as well as the second computer 14. The JPEG file as depicted on the display would include a major portion 70 on which a digital photograph would appear. Appended to the bottom of the JPEG file photograph would be the photograph tag section of the JPEG 74. This section as illustrated in FIG. 3 would include a caption marker 76, a copyright marker 78 as well as a header marker 80. Other textual material such as the photographer's name as well as a description of the photograph could also appear in section 74. As previously indicated, the beginning of the JPEG file would include an SOI marker 82 and would end with the EOI marker 84.

The JPEG format supports general purpose markers for third party applications for a multitude of uses. The JPEG format contains a set of 16 markers designated as APP0-APP15 that are used to store application specific data. These markers would allow information beyond what is specified in the JPEG standard to be stored. Although it is unimportant which of these markers are utilized in the present invention, the photography tag for the present invention will store all of the relevant textual data in the APP10 marker. The JPEG file format does not require that any and all of these markers be used. They are merely definitions of markers that a standard application that opens and reads the JPEG file can ignore. Since they are used for application specific data, it is quite probable that most of the JPEG files will not have any APP markers.

The concept of assigning numbers to these APP markers gives 15 possible APP markers that may be used. The present invention has chosen to use the APP10 marker purely on an arbitrary basis. However, if another application decides to employ the APP10 marker for their own internal reasons, the APP 10 marker of the present invention will be differentiated from these other APP10 markers by the inclusion of a signature in the marker structure that is 8 bytes long.

The APP10 marker utilized in the present invention inside the JPEG file will contain basically the same data structure as shown in Table I.

TABLE I

| Data Item | Data Type | Description |
| --- | --- | --- |
| Marker | 2 Bytes | JPEG Marker (APP10) |
| Length of Data | Word | Length of the Data contained in this marker |
| Signature | 8 Bytes | Photography tags standard signature - "Pho-Tags" |
| Type | Byte | Type of Photography tag<br>1 - Header<br>2 - Non Display Data (text or other)<br>3 - Displayable Text Data |
| Data | Byte | The data bytes. The structure of the data will be expanded below for Header Marker and TextData marker types. For Sound type, the data is the raw sound bits. |

The photography tag application requires three types of markers, namely a header marker, a non displayable data marker and a displayable text data marker. The particular type of marker will be indicated in the type field in the header structure as shown in Table I.

The header marker 80 (see FIG. 3) resides just in front of the EOI marker 84. This marker is the first one loaded by the photography tag software development kit (SDK) and will have a fixed size so that it can be accessed correctly. The structure of the header marker is shown in Table II. The header marker is used to point to the first photography tag marker in the file so that it can be quickly accessed rather than to scan all the markers in the file sequentially. The header marker also contains the height in bytes of an external caption area appended to the JPEG file if the user decides that the caption will not be embedded in the picture but displayed in an attached area 76 (see FIG. 3) under or above the picture. The header marker would also contain where the caption is positioned, a password or passwords allowing the protection of all of the data in the picture and allowing an individual to alter this data, the background color of the caption area, the current photography tag version number as well as the length of the structure so that it can support backwards compatibility. This is important since the length of the header is read as the first piece of data when the structure is loaded and is the last bit of the header structure located just before the JPEG EOI tag. The header marker also contains the particular photography tag version number being utilized.

TABLE II

| Data Item | Data Type | Description |
| --- | --- | --- |
| PtrToFirstMarker | DWord | A pointer to a location in the file that contains the first photograph tag |
| HeightOfCaption | Word | Height in bytes of external caption area, zero if not used |
| CaptionPosition | Byte | 1 - Top<br>2 - Bottom<br>3 - Right<br>4 - Left |
| Password | Char(8) | 8 character password that allows protection of all data in the picture |
| Frame Width | Word | If the user wants to attach a frame to the photo, then this number is greater than 0. The number will determine the width of the frame in pixels. |
| BackgroundClr | DWord | Color of background for caption area if used |
| VersionNo | Word | Version of the current photograph tag |
| LengthOfHdr | Word | Length of this structure. So we can support backwards compatibility |

The non displayable data marker can hold any form of data for a single element and would include the concept of open field names. This means that the application can create its own field types. As shown in Table III, these internal fields could contain but are not limited to the type of caption, the name of a photographer, the copyright notice, the date of the photograph, a textual description as well as sound. Other types of fields such as a price of the photograph could also be included. The structure of the non displayable data marker is shown in Table III. This data marker allows a user to store any form of the data in the JPEG file that is not used for displaying. This data can be used for searching various items in this database. It is important to note that this data need not be textual and would also include sound data. This is important since the searching capacities of the present invention would then not be limited to just textual data but would also include the possibility of searching the audio data. Various input devices associated with the present invention such as voice recognition devices can be employed in this searching process.

TABLE III

| Data Item | Data Type | Description |
| --- | --- | --- |
| Data Type | 1 byte | The type of data to be held:<br>1 - Text<br>2 - Integer<br>3 - Floating point numeric<br>4 - Date<br>5 - Byte stream (used for sound) |
| Field Name | Text | Name of the field (e.g., Caption, Price, etc.) |
| Data Length | Word | The length of the data |
| Data | Depends on the type described in the Data Type | The actual data that is stored |

The caption marker 76 as well as the copyright marker 78 is stored in the JPEG file in front of the header marker 80. The types of textual data which is stored in this file could include a caption, a time stamp, the name of the photographer, a copyright notice as well as a sound commentary. The structure of the test data marker is shown in Table IV. If the text is to be embedded into the JPEG file picture, it stores the bits of the picture before the overlay so that it may support editing and rebuilding of the old picture, if needed. All of the text fields are designed to be of variable length, thereby requiring that there be a length field proceeding each of the text field data attributes.

Figure 7:
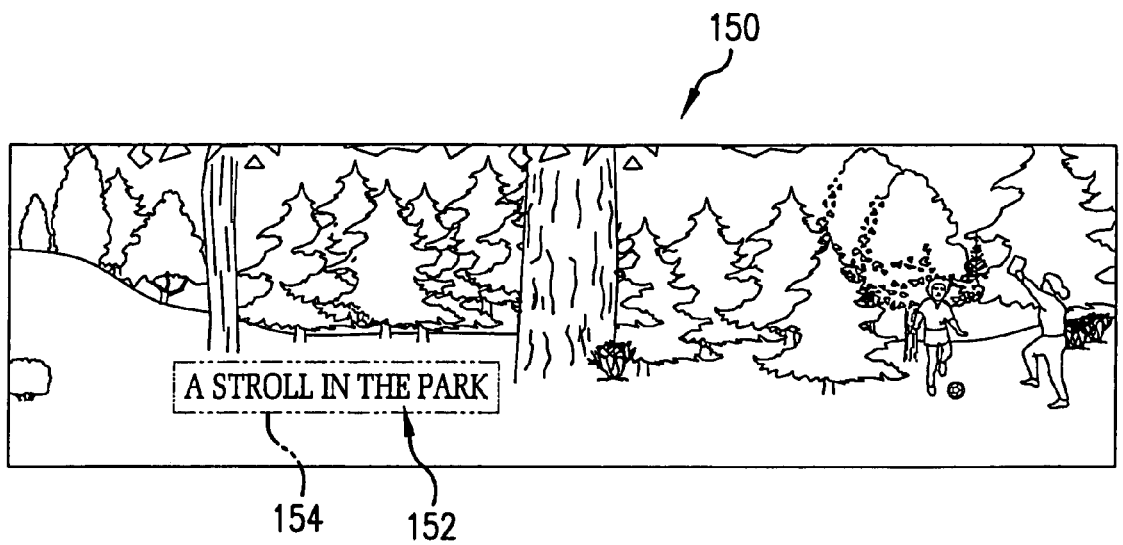
FIG. 7 is a drawing showing a photograph.
Figure 8:
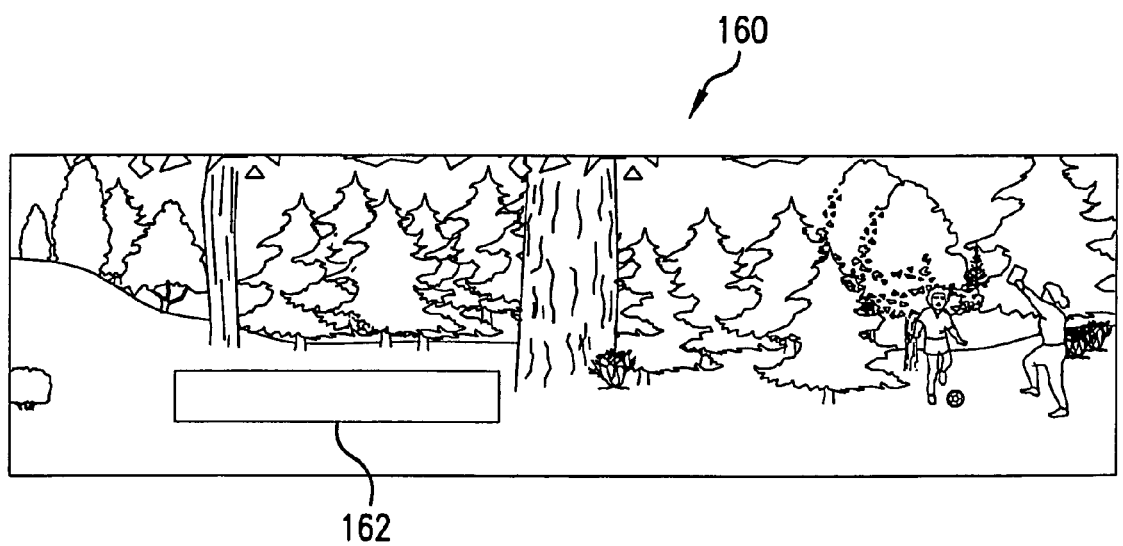
FIG. 8 is a drawing showing the photograph of FIG. 7 including textual material provided with the photograph.

The displayable text marker is illustrated in Table IV. The displayable text marker stores the display attributes of a piece of text and is basically a superset of the non displayable marker since it contains all of the information contained in Table III as well as all of the information contained in Table IV. The main difference between Table III and Table IV is that Table IV also contains the display attributes of the text. Furthermore, if the text is to be embedded to the photograph, the displayable text marker would store the bits of the picture before any overlay is created. This is important so that the photograph and the textual material may be edited subsequent to the compilation of the JPEG file as well as rebuilding the photograph created before the overlay, if this is necessary. The RGBBits store the bits of the picture area being overlayed. These are the pixels of the picture which has been eliminated from the photograph when textual material is embedded therein. This is illustrated in FIGS. 7 and 8 which show a typical photograph. The photograph 150 shown in FIG. 7 contains the phrase "A Stroll in the Park" 152 provided within a rectangle 154. The photograph 160 in FIG. 8 eliminates the phrase "a stroll in the park" which is not contained in the rectangle 162. Consequently, if the picture 150 was edited to eliminate the phrase "A Stroll in the Park", the pixels of the picture which were overlayed by that particular phrase would now be included in their proper location within the rectangle 162. Consequently, by storing the information in RGBBits whenever the text needs to be edited, the pixels are simply reloaded without the text in a process called decomposing as will be subsequently explained. Finally, if the textual material is to be embedded into the photograph, using a process called composing as will be further explained, the pixels with the newly edited text are then reinserted into the picture.

TABLE IV

| Data Item | Data Type | Description |
| --- | --- | --- |
| TextColor | Color | Color of Text |
| FontLen | Word | Length of the font type |
| FontName | Char | Font |
| FontSize | Word | Size of the font |
| FontStyle | Word | Style of font Bold, Underline, etc. |
| Position | Rect | x, y, w, h of the location in the picture that this text will be displayed |
| xyRotation | Word | x, y degrees to rotate the text |
| zRotation | Word | Rotation of the text around the z axis |
| RGBBitsLen | Word | Length of the RGB bits string |
| RGBBits | Byte | Bits of the picture area being overlayed |

Figure 4:
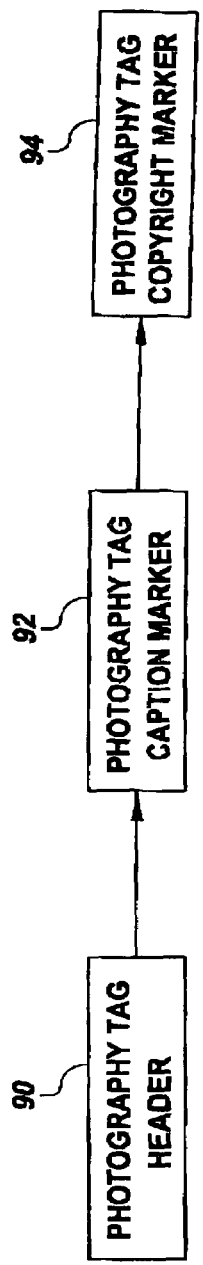
FIG. 4 is a block diagram showing the JPEG file loaded into a memory.

Referring to FIG. 4, the photography tag application is loaded into the memory of one of the computers 12, 14 or the camera 10, cell phone or any other memory device so that the appropriate textual material can be created and appended to the JPEG file. This data could also be modified by an authorized user as will be described. Each of the type of data included in the memory will be connected as a link list, whereby the photography tag header 90 points to the photography tag caption marker 92 which in turn points to the photography tag copyright marker 94. As can be appreciated, other types of textual material would operate in the same manner such as the photographer's name, a time stamp as well as a sound commentary. Therefore, referring to Table II, in order to retrieve the data in the copyright marker 94, one would begin with the pointer to the first marker and then go to the pointer of the next marker in line. Once a particular marker is loaded, it then will be possible to access and edit all of its attributes. For example, to read the copyright notice, one would traverse all of the nodes to get to the copyright tag and then load the text string from the copyright tag.

Figure 5:
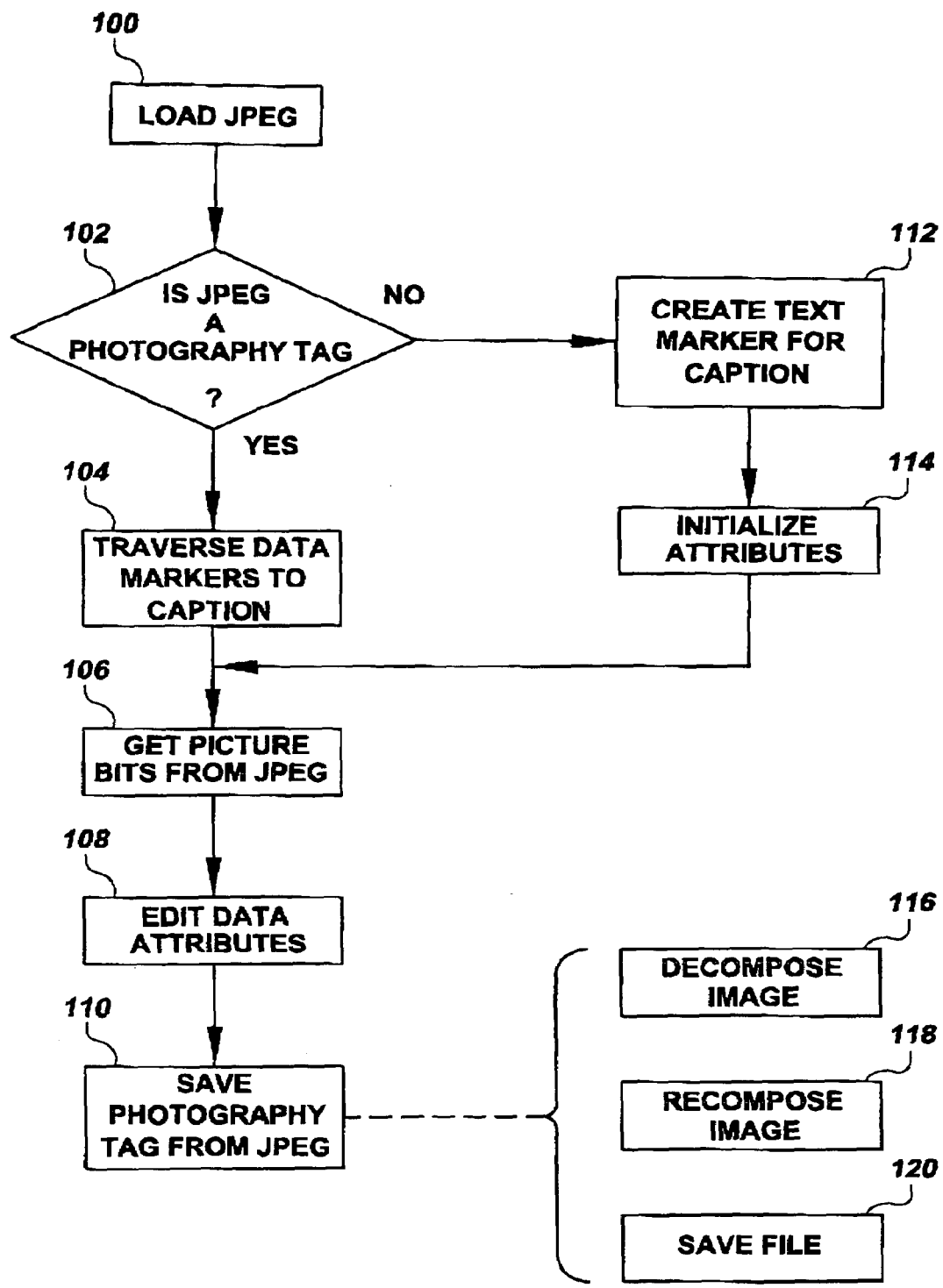
FIG. 5 is a flow chart showing the process of editing a text data marker.

The present invention utilizes a software developing kit which is loaded in both the device in which the JPEG file including the textual material is created or compiled as well as the device in which the complete JPEG file including the textual material would be sent. Initially, as illustrated in FIG. 5, a JPEG file would be loaded into the device which could be a camera, computer, cell phone or similar implement. The photography tag software would then check whether the JPEG file has any of the photography tag markers inside the file. If this is the case, the header marker 80 (see FIG. 3) is then located which points to the first tag which in turn points to the next tag as previously described. If there is no photography tag marker in the JPEG file at step 100 or 102, the proper markers are created as shown in steps 112, 114. This is accomplished by calling a create marker having the ability to produce a new caption including all of the types of textual materials described previously. Once the marker has been created, it is then possible to set all of the particular attributes such as the position of the caption, the type of fonts, the color of the font, etc.

If a JPEG file is loaded having the proper markers, all of the data markers are loaded into a memory as shown in step 104. This is true whether the JPEG file has all of the markers therein when it is loaded or whether the markers have recently been created. At this point, it is now possible to gain access to each of the data markers. It is now also possible to obtain all of the picture bits of the bit map located in the JPEG file so that the picture can be displayed on a screen as illustrated by step 106. At this point, any of the data attributes provided in the data marker can be edited as step 108. As will be subsequently explained, this edit step can only be accomplished if the potential editor has entered the proper password. After all of the data attributes have been reviewed and edited, if necessary, the JPEG file will now be saved as step 110.

The process of saving the photography tag file is accomplished by initially decomposing the image at step 116 in which the actual photograph is decomposed and then rebuilt, eliminating the photography tag inside of the JPEG file. This means that the end of the decomposition step 116 the photograph would be as if it returned to its original pre-captioned state. This is important since all of the textual data must be rebuilt within the photograph after it has been edited.

The method of decomposing would initially include the step of traversing through all of the data marker nodes. For each node, the RGBBits attribute is obtained. These bits are the original picture pixels of the area that the text is currently overlaying. If there is no overlay, this step would not be necessary. For each RGBBit it has to be re-overlayed on top of the rectangle position (a second attribute in Table IV). This step would effectively erase the pixels that have the text of the marker and would return the original rectangle pixels that were included before the text overlay. This step must be done for all of the text markers that have been created in the photography tag JPEG file.

At this point, as indicated by step 118, after all of the old data has been removed and the image returned to its original pre-photography tag state, the picture must be recomposed. This means that all of the text markers must be rebuilt into the picture. This is accomplished by traversing to all of the data marker nodes and, for each node, the proper rectangle position must be extracted in the picture where the text is to be overlayed. This is produced by extracting the original pixel bits from the photograph that was decomposed and saved in the RGBBit attribute in the text marker. The text string, font, color, etc. from all of the attributes are then written into the picture. Therefore, since the portion of the picture behind the textual material was saved, the original picture can always be reconstructed. This process must be accomplished for all of the text markers created in the photography tag JPEG file. Finally, the recomposed image is saved as step 120 by saving the picture pixels of the JPEG, saving the photography tag data markers, saving the photography tag header and then rewriting the EOI marker. At this point, the produced JPEG file including the textual material can be transmitted to various devices as shown in FIG. 1.

As previously indicated, the present invention allows the transference and editing of a JPEG file including textual material. However, to insure that only authorized individuals can edit this material, the photography tag software includes a security mechanism allowing the creator of the JPEG file to protect the data inside the file from being modified without permission of the creator. This security system would also decide which photography tags will be viewed on the picture as well as how they will be viewed.

Figure 6:
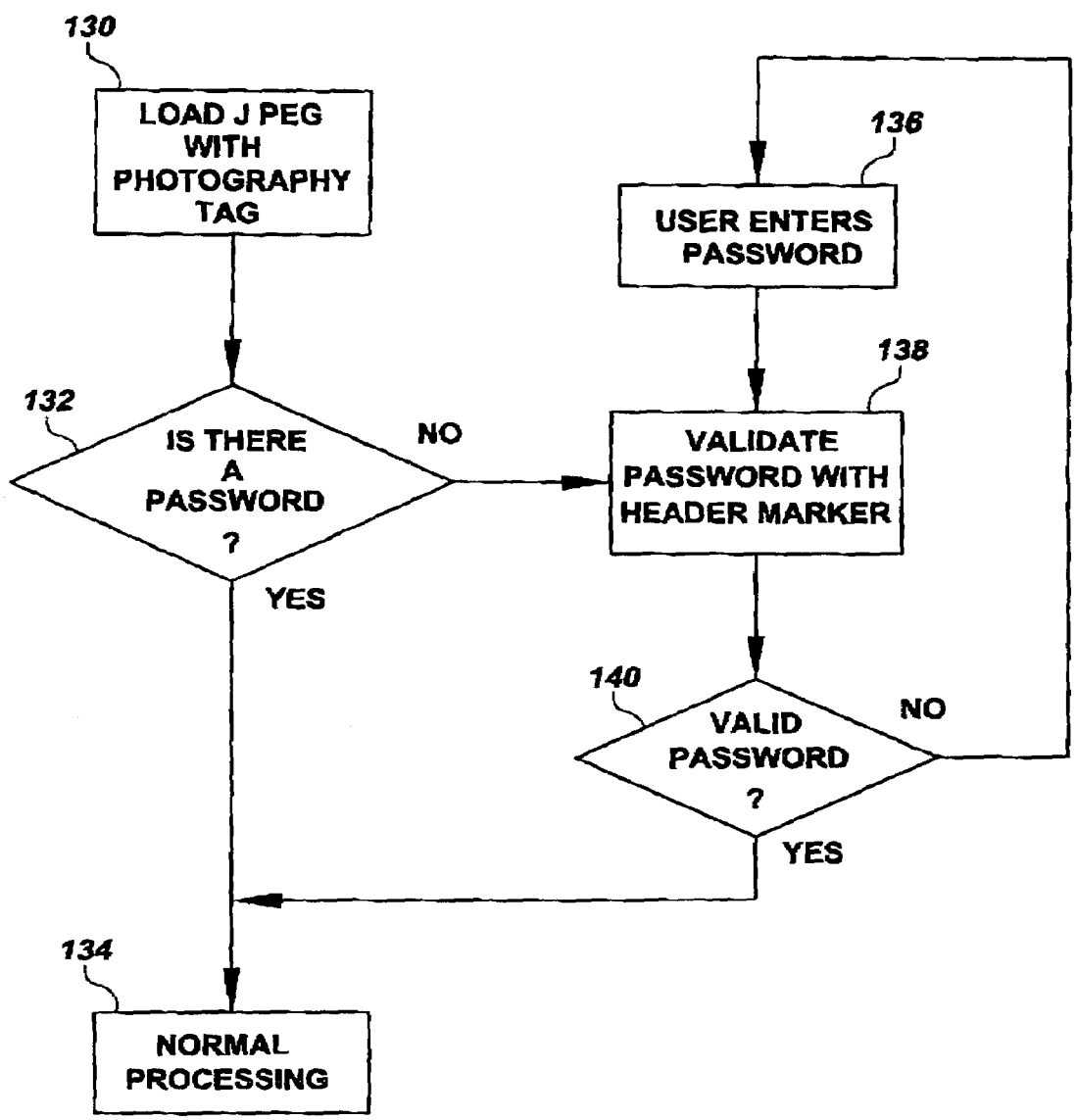
FIG. 6 is a block diagram showing the operation of editing a photograph tag.

The security aspect of the present invention operates since the header marker as illustrated in Table II includes a password. Therefore, as shown in FIG. 6, when the JPEG with a photography tag is loaded into one of the devices shown in FIG. 1, at step 130, a check would be made at step 132 to determine whether a user at step 136 entered a password. Unless a valid password is entered, all editing operation would be halted. The software, at step 138, would check to insure that a validated password as contained in the header marker was entered by the user. If this was not the case, the user would have another opportunity to enter a valid password. If a valid password is not entered after predetermined attempts, no editing would be allowed. If, however, at step 140 a valid password was entered, normal editing processing at step 134 would be enabled.

Furthermore, as previously indicated, the software of the present invention can be composed in a manner allowing a first individual to edit all of the non-photographic material included in the JPEG file, but preventing a second individual from modifying some of this data, but allowing this second individual to change other sections of the data. This is accomplished by including more than one password as shown in Table II and illustrated in FIG. 6. Based upon the assignment of different passwords to different individuals, full or limited access would be given for the purpose of editing the non-photographic material on the JPEG file. Finally, the application could be formulated preventing any editing of some of the data, such as the time stamp.

The embodiment of the present invention in which a watermark is created to cover all, or a significant portion of a digital picture saved in a JPEG file will now be described. Although technically the entire digital picture or a relatively small part of the digital picture would be covered by using the watermark, or a number of watermarks, more typically 75% and up to 90% of the pixels of the digital picture would be covered by the watermark or watermarks. For purposes of explanation, it is noted that a digital picture is created and a watermark is applied to the digital picture and stored in a JPEG file, in a manner similar to the method in which a digital picture is created and textual material replaces a portion of the digital picture. This original portion of the digital picture which has been replaced is stored in the marker section of the JPEG file. Similar to that embodiment, the present invention would store the appropriate material that the watermark has replaced in the marker section 74 of the JPEG file 70 as illustrated in FIG. 3. This material would indicate the material of the original digital picture that was virtually overlayed or replaced with the appropriate watermark or watermarks. Additionally, a password as will be hereinbelow explained, is embedded in the header marker 80 of the JPEG file 70, thereby preventing unauthorized access to the original pixels. A digital picture is created in a manner similar to the system shown in FIG. 1 utilizing a digital camera 10 in communication with a first computer system 12 having a hard drive 18 containing a memory thereon into which the digital picture is loaded. It is noted that the memory of the hard drive 18 would include a memory capable of being loaded with a number of software programs. It is also noted that although FIG. 1 shows the use of a digital camera 10 to create the digital picture, to be loaded into the hard drive 18, any method of transmitting a digital picture to the computer system 12 could be employed.

Figure 9:
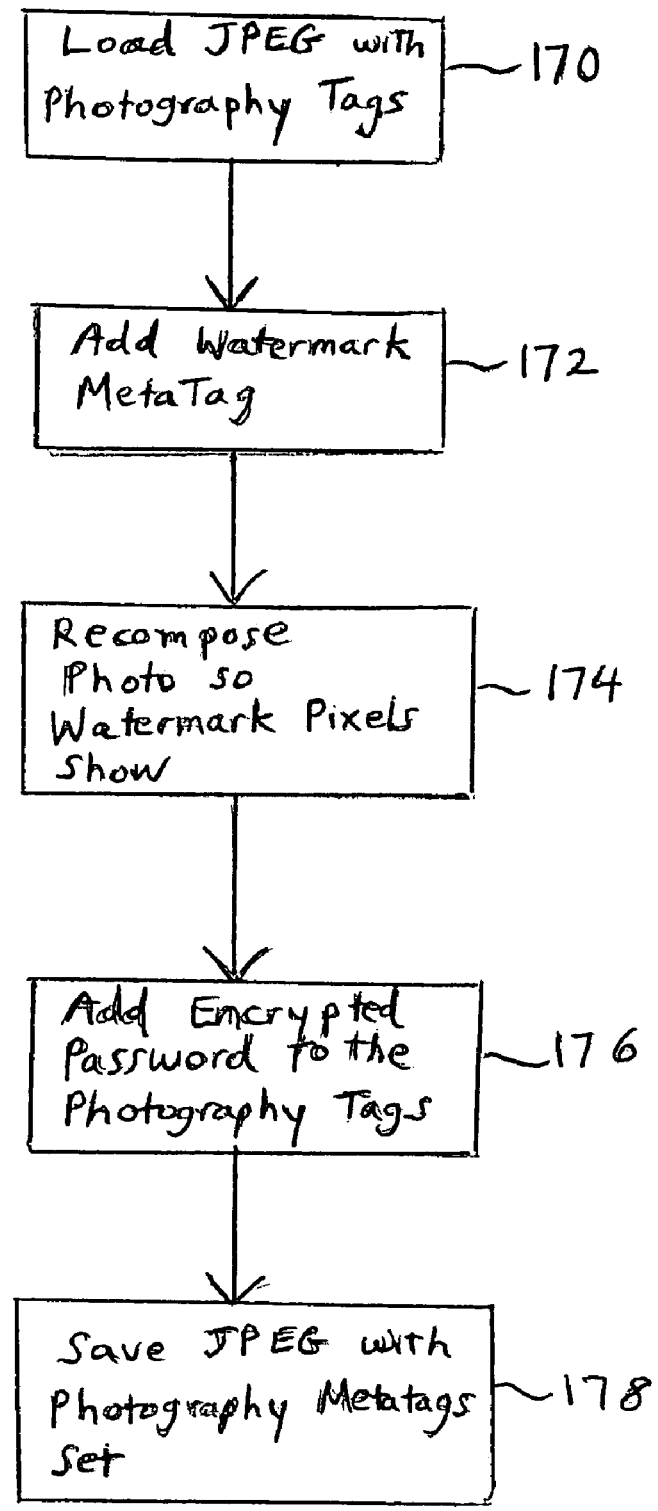
FIG. 9 is a flow diagram showing the manner in which a watermark is added to a digital picture.
Figure 11:
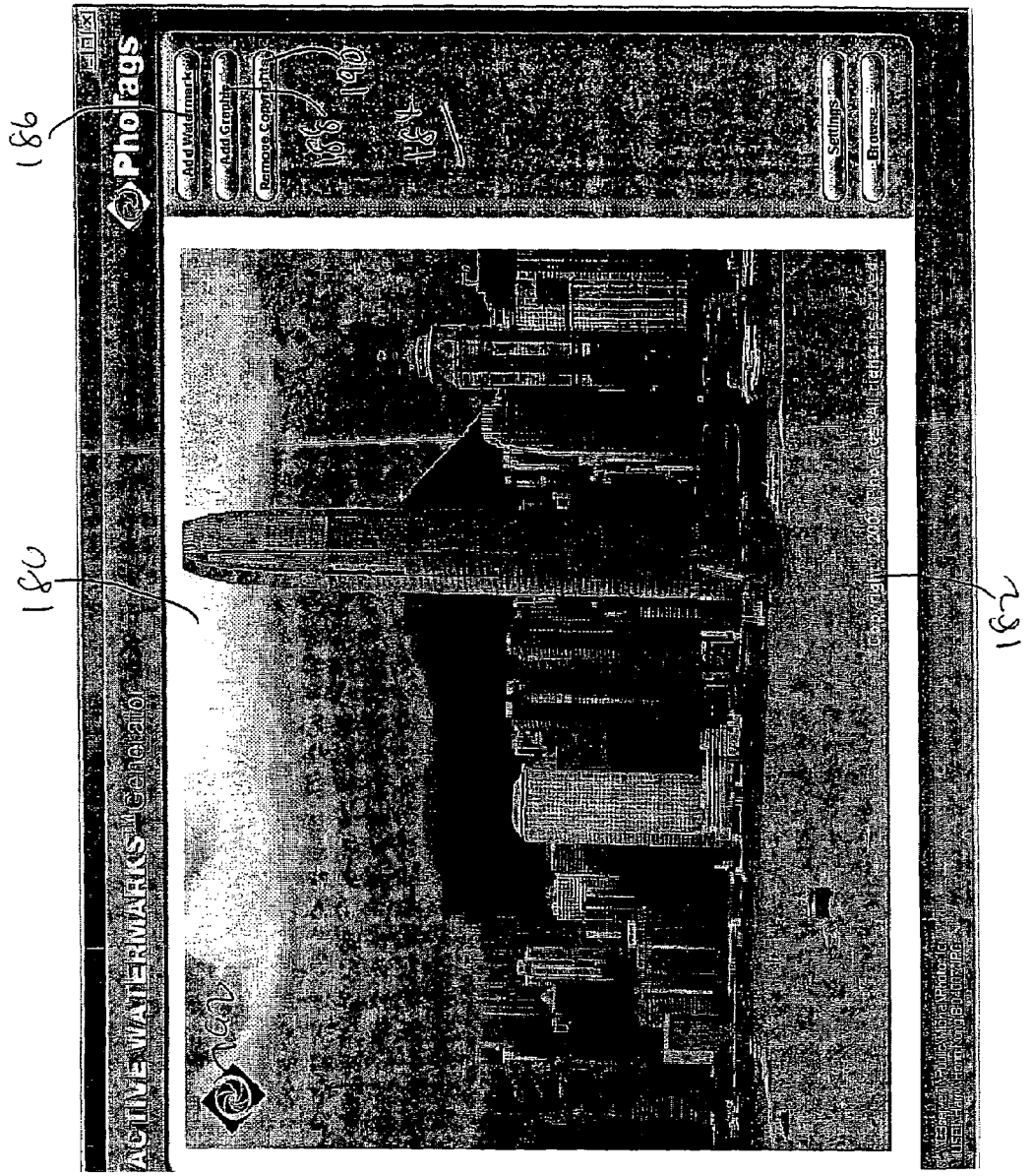
FIG. 11 is a drawing showing an original digital picture.

Utilizing the software included in the hard drive 18, or any memory device in communication with the computer system 12, a JPEG file would be created into which an original digital picture would be included. In this regard, reference is made to FIG. 9 which shows a flow diagram of the method in which a digital picture is provided with a watermark. A previously indicated, a JPEG file is created in which an original digital picture is included along with the JPEG markers as previously described and illustrated in FIG. 3 and indicated by step 170. A software program included in the memory of the computer system 12 would allow watermarks to be virtually overlayed with the original digital picture as illustrated in step 172. This original digital picture 180 is illustrated in FIG. 11 as it appears on a computer monitor. This screen with the original digital picture 180 should appear on the monitor 20 of the first computer system 12.

The software program is in the form of a watermark generator utilized by an operator of the system 12. The operator would create a watermark as well as its font type and size. The software program would produce a translucent font style and algorithmically regenerate the watermark as many times in horizontal lines across the digital picture to ensure that the entire image is covered by the watermark to prevent unauthorized use of any portion of the protected digital picture. Graphics, including the logo of the operator can then be added to the digital picture at the appropriate location. The copyright notice would also be added to the digital picture in a similar manner.

A JPEG file as shown in FIG. 3 would be created and would include the original digital picture 180. The appropriate watermark meta tag, along with meta tags for the graphics and the copyright notice would also be included in the JPEG file markers. The JPEG file marker would also include the location in the pixels in the original digital picture, replaced by the watermark, the graphics and the copyright notice to create an "altered" digital picture. The watermark would be composed utilizing the software included in the generator used to virtually overlay a substantial portion of the original digital picture 180. The software would include a plurality of types of watermarks which could be utilized. Once a particular watermark is chosen, it would be added to the JPEG marker as well as substantially cover the screen as shown by the "altered" digital picture 194 including watermarks 196, 198, 200, 202, 204 and 206. These watermarks will be added by utilizing the "add watermark" button 186 associated with the computer monitor 20.

It must be noted that the user would only need to choose the type of watermark which would be applied to the original digital picture, in this case the watermark "Active Watermarks". The software would then calculate the number and placement of the watermarks to create the "altered" digital picture 194. The location of each and every one of these watermarks would be included in the meta data included in the JPEG markers at step 172. At this point, the digital picture 194 with the appropriate watermarks would then be created as shown in FIG. 12.

A further feature of the present invention would give the owner or other individual associated with the original digital picture to include additional graphics, such as a company logo 192 to appear in both the original digital picture 180 as well as the "altered" digital picture 194. The add graphic button 188 in FIG. 11 can be utilized to add the graphic 192 to the original picture 180 and the remove graphic button 210 in FIG. 12 would be used to remove the graphic 192 from the "altered" digital picture 194. Additionally, the appropriate copyright notice 182 is added to the original digital picture 180 and would remain in the "altered" digital picture 194. Based upon the software utilized, the inclusion or removal of this copyright notice could be solely in the hands of the operator of computer 12 or could be ceded to the ultimate receiver of the "altered" digital picture 194. The removal of the copyright notice would be accomplished using the removed copyrights button 190.

Due to the fact that it is important to maintain control of the utilization of the original digital picture 180, authorization to change the contents of that picture including the removal of the watermark or watermarks must be strictly maintained. Therefore, at step 176 an encrypted password would be added to the JPEG marker, such as the header marker 80 in FIG. 3. Once the JPEG file including the original digital photograph, the "altered" digital picture, the appropriate meta data relating to the watermark, graphics, copyright notice, and the encrypted password are added to the JPEG file to create a complete JPEG file, this complete JPEG file would be saved at step 178.

The resulting JPEG file would contain an original photograph that is viewable to any user using any operating system that is capable of viewing JPEG files. It would also contain a watermarked text virtually superimposed upon a substantial portion of the original digital picture. The JPEG file would also contain graphic material, such as a logo and the copyright notice which would or would not be hidden from view.

The original pixels of the digital picture without the watermarks would be stored inside the JPEG file markers in a compressed and encrypted format. Therefore, any user that utilizes any standard editing software to modify the pixels in an unauthorized manner, will destroy the original digital picture such that this original digital picture can never be recovered. Therefore, the unauthorized user would be left with only the "altered" digital picture as shown in FIG. 12.

Figure 10:
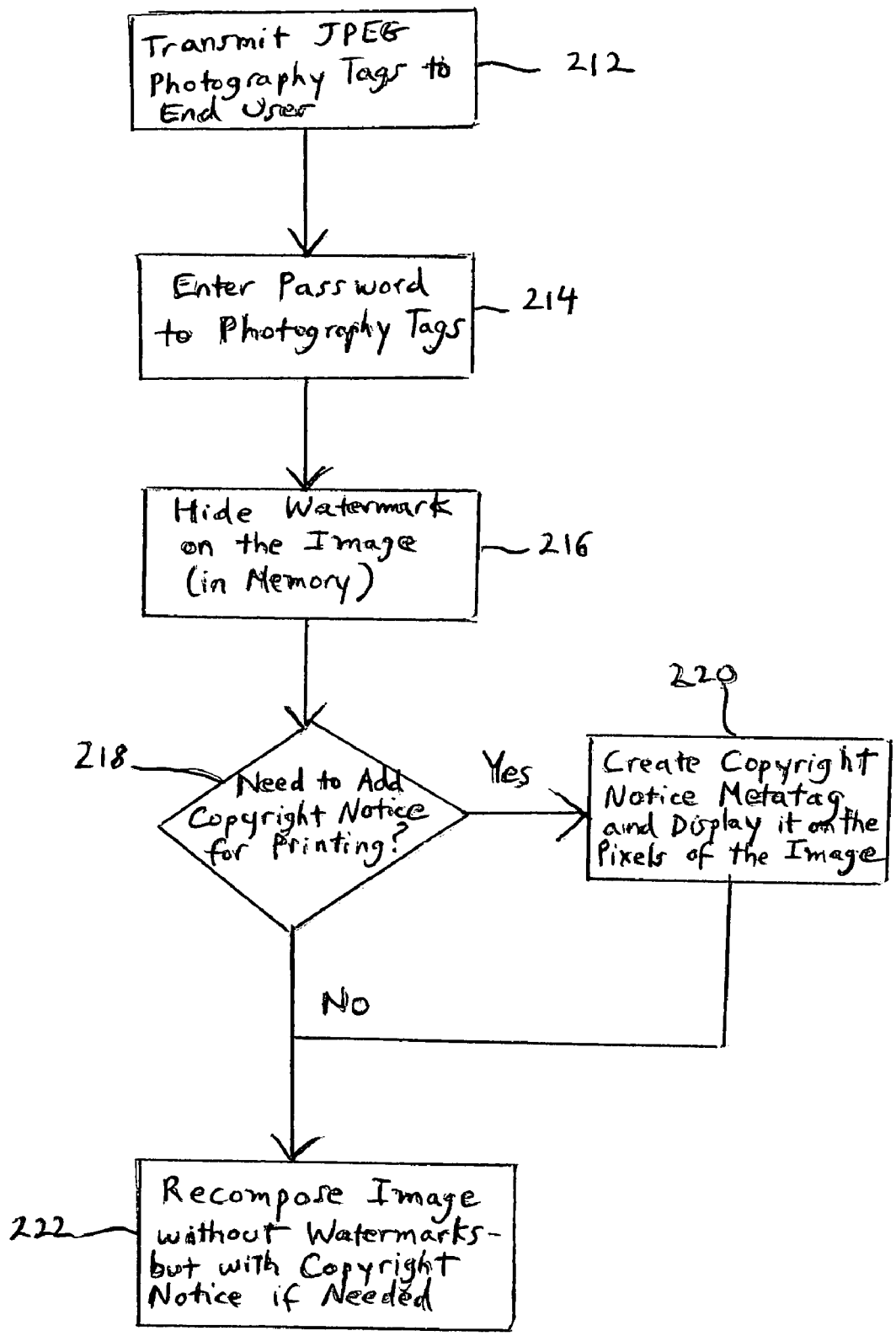
FIG. 10 is a flow diagram showing the manner in which the watermark is removed from a digital picture.

Once one or more JPEG files as shown in FIG. 3 are created for one or more digital pictures, and these files have been properly tagged, the completed JPEG file or files are then transmitted to an end user computer system 14 as shown in FIG. 1. This step is shown in FIG. 10 which illustrates the removal of the watermarks from the original digital photograph. Once the JPEG with the proper photography markers are sent to the end user at step 212, the end user would be able to view the "altered" digital picture 194 on its monitor 30. This "altered" digital picture 194 has the majority of the original digital picture obscured by the watermarks provided thereon. At this point, if the end user, or any unauthorized user would attempt to print the digital picture, this digital picture would be provided with the watermark thereon.

Access to the original digital picture 180 would be provided to the end user utilizing two alternatives. In the first alternative, the password is entered at step 214 by the original user when the end user contacts the creator of the original digital image, and that creator employs the embedded and encrypted password provided in the JPEG header to recreate the original digital picture without the watermark. This original digital picture would then be viewed by the end user as well as printed by the end user without the watermark appearing thereon. It is noted that the logo 192 as well as the copyright notice 182 would generally still be maintained in the original digital picture as printed by the end user. It is important to note that the resulting original digital picture will be stored only in the memory of the computer of the end user. The end user can then use the original digital photograph as is required as long as it abides by their licensing agreement with the operator or the copyright owner.

A second alternative to allow the end user to view and to print the original digital picture 180 without the inclusion of the watermark would be to transmit an active tag application to the end user, the application including a password therein to unlock the digital picture. Therefore, when the end user enters the password, it would allow the end user to remove the watermark using button 208 of FIG. 12 as well as removing the graphic using button 210. Once unlocked, the watermark and the graphic would seem to disappear, but would actually be hidden to the viewer. The copyright notice would generally still appear. It is noted that in certain situations, the end user could, utilizing the button 190, remove the copyright notice. However, it is important to note that based upon the software application provided to the end user, this removal of the copyright notice might be beyond the end user's control. It is also important to note that a licensed end user would only want to employ a portion of the original digital photograph 180. If this occurs, the original user would generally wish to copyright notice 182 to appear in even a small portion of the original digital picture 180. Therefore, the software included in both the original user's computer as well as transmitted to the end user would automatically insert the copyright notice 182 when any portion of the original digital picture 180 is downloaded and printed. The operator will have the option without the knowledge of the end user to routinely reset the lock, in which case the watermark and the graphic would appear on the image, as well as changing the password initially sent to the end user, preventing the end user from deleting the watermark.

Returning to FIG. 10, based upon either of the above described alternative, properly entering the password at step 214 would hide the watermark on the image 216. Thereafter, based upon the particular software program, a decision would be made at step 218 whether to add the copyright notice. If this copyright notice is to be added, step 220 would create the copyright meta data and display it on the pixels of the image. If the copyright notice is not to be printed, the original digital picture would be recomposed at step 222 and would appear on the end user's screen as shown in FIG. 11.

The present invention prevents the unauthorized removal of the watermark on an original digital picture, since the original pixels of the original digital picture are now stored in the marker area of the JPEG file. If someone tries to erase the tags in the marker area, the unauthorized user would unwittingly destroy the original digital picture and the watermark would become a permanent part of that image with the original pixels eliminated. Furthermore, since the hidden text data is provided in the marker section of the JPEG, and an unauthorized user endeavors to eliminate the meta data, the original owner could detect that the hidden information has been removed and a violation could be asserted.

It will be appreciated that, although an embodiment of the present invention have been described in detail for purposes of illustration, various modifications may be made without departing from the spirit and scope of the invention. Therefore, the invention is not to be limited except as by the appended claims.

What is claimed is:

1. A system for allowing an operator to create a watermark to be applied to an unaltered complete digital image photograph comprising n pixels to produce an altered digital image photograph:
    a first device for producing a first image file of the complete digital image photograph including an image section and a marker section;
    a watermark production device included in said first device for producing at least one watermark translucently covering a portion of the complete digital image photograph, said at least one watermark consisting of m pixels, wherein said m pixels is less than the n pixels of the unaltered complete digital image, said watermark production device replacing m pixels of the unaltered complete digital image with said m pixels of said at least one watermark, to create the altered digital image comprising n-m pixels of the unaltered complete digital image and m pixels of said at least one watermark, said watermark production device replacing the m pixels of the complete digital image corresponding to the m pixels of said at least one watermark with said m pixels of said at least one watermark in said image section of said image file, and further including said m pixels of the complete digital unaltered image corresponding to the m pixels of said at least one watermark in said marker section of said first image file, to produce a second image file, including said altered digital image and a marker section;
    a device allowing the operator to transmit said second image file to an end user; and
    a second device for inserting a password into said marker section of said second image file, preventing the complete digital image photograph from being produced by the end user, without said password being transmitted to the end user, wherein said password allows the end user to produce the complete digital photograph image only once.

2. The system in accordance with claim 1, wherein said at least one watermark covering a significant portion of the complete digital image photograph.

3. The system in accordance with claim 2, wherein said at least one watermark covering between 75% to 90% of the complete digital image photograph.

4. The system in accordance with claim 1, wherein said watermark production device is provided with software to allow the operator to choose a particular watermark to cover the complete digital image photograph, said software producing a plurality of said particular watermark to cover a portion of the complete digital image photograph.

5. The system in accordance with claim 4, wherein said password is directly transmitted to said second image file without any intervention from the end user.

6. The system in accordance with claim 4, wherein the operator produces an application transmitted to the end user, said application provided with said password, thereby allowing the end user to utilize said password a plurality of times to produce the complete digital image photograph.

7. The system in accordance with claim 4, wherein the operator can remotely change the password included in said marker section of said second image file.

8. The system in accordance with claim 1, wherein said password is directly transmitted to said second image file without any intervention from the end user.

9. The system in accordance with claim 1, wherein the operator produces an application transmitted to the end user, said application provided with said password, thereby allowing the end user to utilize said password a plurality of times to produce the complete digital image photograph.

10. The system in accordance with claim 1, wherein the operator is provided with a notice device for affixing a copyright notice to the complete digital image photograph, said copyright notice included in said marker section of said second image file.

11. The system in accordance with claim 1 further including a means for transmitting the password to said second image file, thereby allowing the end user access to the complete digital image.

12. The system in accordance with claim 11, provided with a means of allowing the end user to download only a portion of the complete digital image.

13. The system in accordance with claim 1, wherein said first and second image files are JPEG files.

14. A method for allowing an operator to create a watermark to be applied to a unaltered complete digital image photograph comprising n pixels, comprising the steps of:
    producing an unaltered complete digital image photograph in a first device;
    producing a first image file of the complete digital image photograph including an image section and a marker section in a second device;
    producing at least one watermark translucently covering m pixels of the complete digital image photograph, wherein m<n;
    replacing m pixels of the complete digital image photograph with said m pixels of said at least one watermark to create an altered digital image comprising n-m pixels of the complete digital image photograph and m pixels of said at least one watermark;
    including said m pixels of the complete digital image replaced by said m pixels of said at least one watermark in said marker section of said first image file to produce a second image file, including said altered digital image and a second marker section;
    inserting a password into said second marker section to prevent the unauthorized utilization of the complete digital image;
    transmitting said second image file to an end user; and
    allowing the operator to remotely change said password.

15. The method in accordance with claim 14, wherein said first and second image files are JPEG files.

16. The method in accordance with claim 14, wherein said at least one watermark covers between 75% and 90% of the complete digital image.

17. The method in accordance with claim 14, including the step of directly transmitting said password to said second image file.

18. The method in accordance with claim 14, further including the steps of producing an application including said password therein are transmitting said application to the end user.

19. The method in accordance with claim 14, further including the steps of producing a series of watermarks to cover a portion of the complete digital image based upon the operator selecting a single watermark style.

20. The method in accordance with claim 14, further including the step of inserting a copyright notice into the complete digital image photograph.

21. A system for allowing an operator to create a watermark to be applied to an unaltered complete digital image photograph comprising n pixels to produce an altered digital image photograph:
- a first device for producing a first image file of the complete digital image photograph including an image section and a marker section;
- a watermark production device included in said first device for producing at least one watermark translucently covering a portion of the complete digital image photograph, said at least one watermark consisting of m pixels, wherein said m pixels is less than the n pixels of the unaltered complete digital image, said watermark production device replacing m pixels of the unaltered complete digital image with said m pixels of said at least one watermark, to create the altered digital image comprising n-m pixels of the unaltered complete digital image and m pixels of said at least one watermark, said watermark production device replacing the m pixels of the complete digital image corresponding to the m pixels of said at least one watermark with said m pixels of said at least one watermark in said image section of said image file, and further including said m pixels of the complete digital unaltered image corresponding to the m pixels of said at least one watermark in said marker section of said first image file, to produce a second image file; including said altered digital image and a marker section;
- a device allowing the operator to transmit said second image file to an end user; and
- a second device for inserting a password into said marker section of said second image file, preventing the complete digital image photograph from being produced by the end user, wherein the operator can remotely change the password included in said marker section of said second image file.

* * * * *